United States Patent [19]
Earhart et al.

[11] 3,836,130
[45] Sept. 17, 1974

[54] LIQUID AERATING APPARATUS

[75] Inventors: Jack R. Earhart; James Dennis Crocker; John K. Johnson, all of Rockford, Ill.

[73] Assignee: Solem Machine Company, Rockford, Ill.

[22] Filed: June 23, 1972

[21] Appl. No.: 265,472

[52] U.S. Cl.............. 261/142, 259/95, 259/115, 261/91
[51] Int. Cl............................................. B01f 7/06
[58] Field of Search........ 259/95, 115; 261/142, 91, 261/120; 219/280; 239/73

[56] References Cited
UNITED STATES PATENTS
3,128,321  4/1964  Hammerschmidt................ 261/142
3,606,273  9/1971  Johnson.......................... 259/115 X

*Primary Examiner*—Francis S. Husar
*Assistant Examiner*—William R. Briggs

[57] ABSTRACT

An apparatus for aerating liquid including an upwardly extending throat having an impeller for pumping liquid upwardly through the throat and a diffuser overlying the upper end of the throat to direct the liquid outwardly in an annular spray pattern, a motor mounted above the diffuser for driving the impeller, and an electrical heater extending around the outer periphery of the diffuser for inhibiting formation of ice on the aerator. The heater is in the form of a ring that overlies the upper side of the diffuser outwardly of the motor and preferably extends outwardly of the periphery of the diffuser at a level to limit the height of the liquid spray pattern.

10 Claims, 6 Drawing Figures

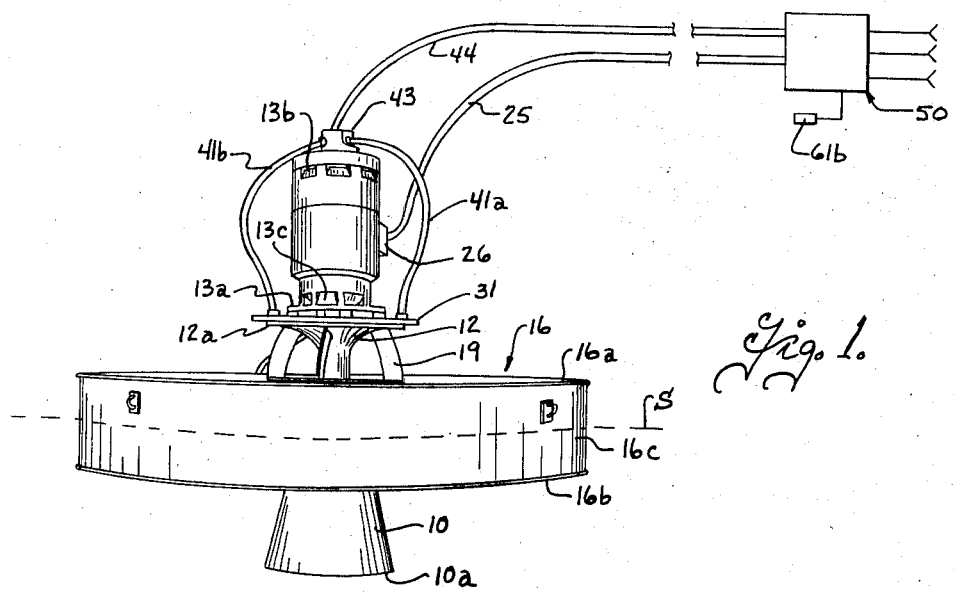
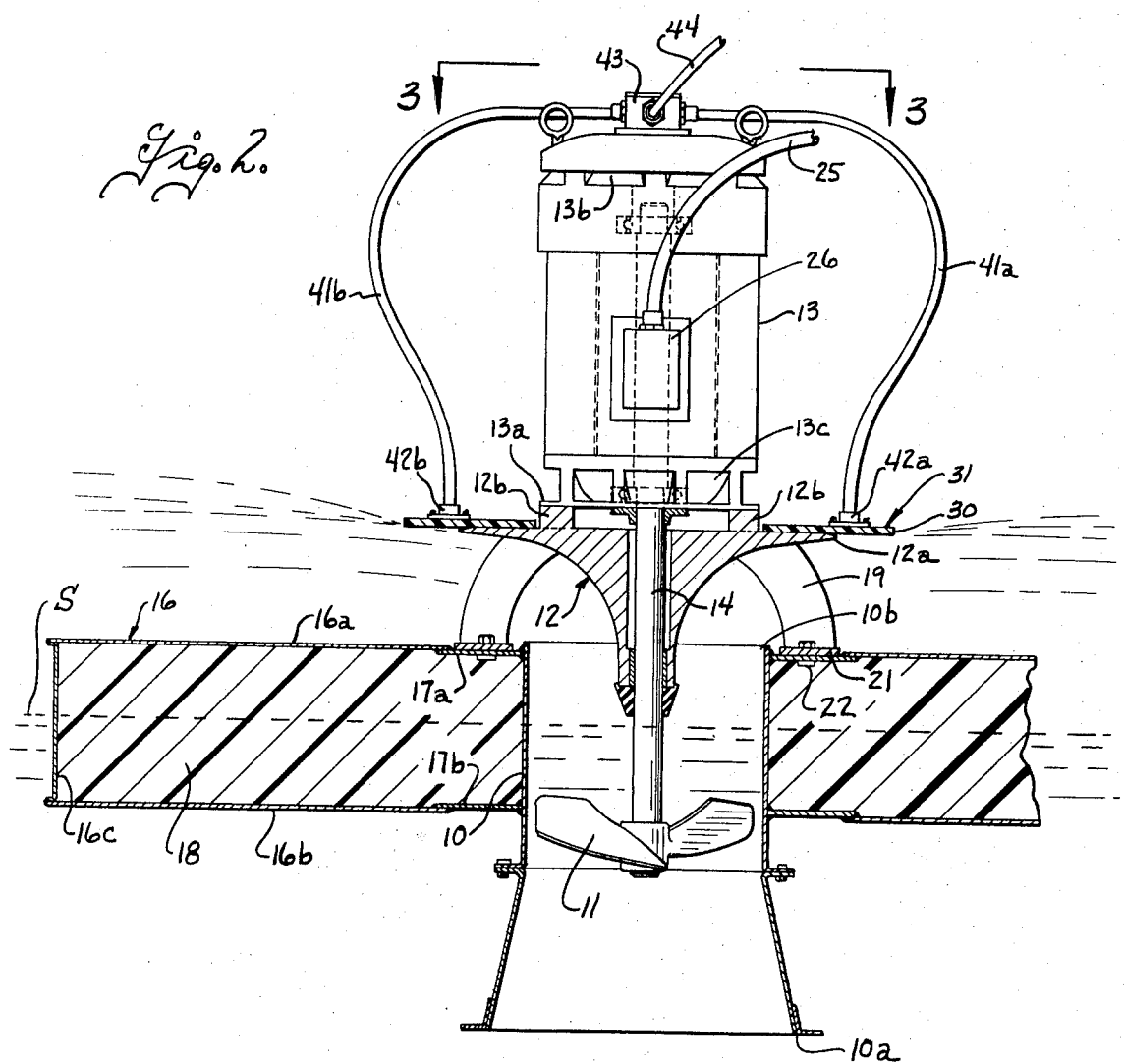

3,836,130

LIQUID AERATING APPARATUS

BACKGROUND OF THE INVENTION

One well-known method of aerating a body of water to increase its oxygen content utilizes mechanical surface-type aerators. Such surface-type aerators are supported by a float or by a rigid mounting platform adjacent the surface of the body of water and operate to withdraw water from below the surface of the pond or reservoir and discharge the same in a spray into the surrounding atmosphere above the surface of the water. While such surface aerators operate satisfactorily under most conditions, icing problems have been encountered when the surface-type aerators are operated in subfreezing temperatures. During normal operation, the water from the reservoir or pond will tend to prevent formation of ice on most of the surfaces directly contacted by the main stream of water passing through the aerator. However, the water is discharged from the aerators in a diffuse spray and, in a high wind, and particularly when the temperature of the water in the pond falls to about freezing temperature, ice formations can occur on the exposed portions of the surface aerator. Such ice formations not only adversely affect operation of the aerator, but also can cause tipping or even inversion of float mounted aerators, as well as other mechanical damage to float and platform mounted aerators.

In an attempt to overcome the problem of ice formation on the aerators, it has heretofore been proposed to wrap the motor in a resistance-type heater and to also enclose the motor in an electrically heated shroud. Such arrangements, however, have not been satisfactory since they tend to cause overheating and damage to the motor.

SUMMARY OF THE INVENTION

The present invention relates to improvements in mechanical surface aeration apparatus of the type having an upright throat immersed at its lower end in a body of water and having an impeller in the throat for pumping water upwardly therethrough, and a diffuser overlying the upper end of the throat for directing the stream of water outwardly in a diffuse spray, with a motor mounted above the diffuser for driving the impeller. In accordance with the present invention, an elelctrical heater means is provided which extends around the diffuser adjacent its outer periphery for heating the outer periphery of the diffuser to inhibit the formation of ice on the diffuser and prevent excessive ice buildup on the aerator. The heater means is advantageously in the form of an annular heater unit that overlies the upper side of the diffuser outwardly of the motor to inhibit formation of ice on the diffuser. The heater unit is advantageously detachably mounted on the diffuser so that it can be removed, if desired, during summer months. The heater unit preferably extends outwardly from the periphery of the diffuser at a level to deflect the water as it is discharged and thereby lower the spray pattern of the aeration apparatus.

An important object of this invention is to provide a mechanical surface aeration apparatus having a heater constructed and arranged to effectively prevent the formation of excessive ice deposits when the aeration apparatus is used in subfreezing temperatures without impairing cooling of the drive motor. Another object of this invention is to provide a heater for a mechanical surface aeration apparatus which can be easily installed and removed in the field.

Various other objects of this invention are to provide a mechanical surface aeration apparatus having a heater to inhibit excessive ice formations thereon and in which the heater does not require removal during summer operation; which is economical to manufacture, and which is automatic in operation.

These, together with other objects and advantages of this invention will be more readily understood by reference to the following detailed description, when taken in connection with the accompanying drawings wherein:

FIG. 1 is an elevational view of a surface mounted aerator embodying the present invention;

FIG. 2 is a fragmentary vertical sectional view through the surface mounted aerator of FIG. 1;

Figure 3:
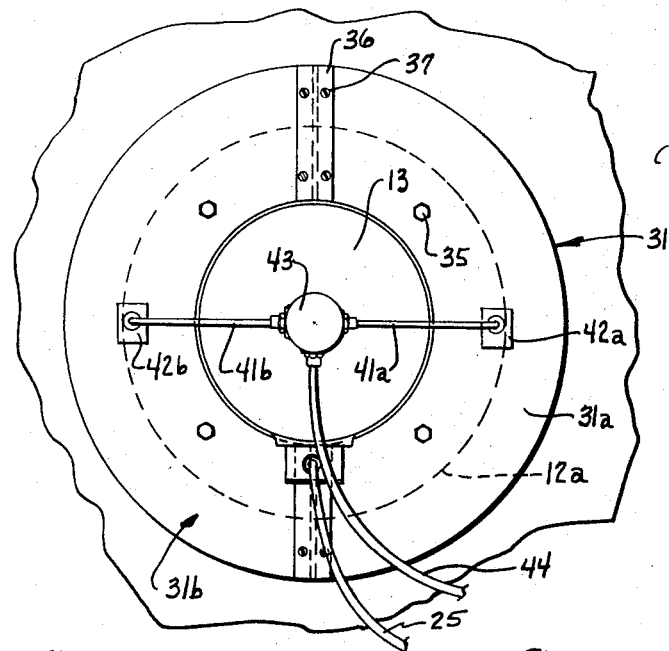
FIG. 3 is a fragmentary plan view taken on the plane 3—3 of FIG. 2.

Referring now more specifically to FIGS. 1 and 2 there is illustrated a mechanical surface aeration apparatus including an upright tubular throat 10 having an impeller 11 disposed in the throat for pumping liquid upwardly through the throat, a diffuser 12 overlying the upper end of the throat, and a motor 13 mounted above the diffuser and having a drive shaft 14 extending downwardly through the diffuser and connected to the impeller 11 for rotatin the same. The surface aeration apparatus is arranged to be mounted adjacent the surface of the pond or reservoir indicated by the liquid level line S with the lower end 10a of the throat immersed in the body of liquid and with the upper end 10b disposed at or above the surface of the reservoir. In the embodiment illustrated, the surface aeration apparatus is supported by a float 16, conveniently metal clad and having top and bottom walls 16a and 16b and a peripheral wall 16c. The top and bottom walls are secured to annular rings 17a and 17b (FIG. 2) secured to the outer periphery of the throat and the float is conveniently filled with a buoyant material such as polyurethane foam 18. While the present invention is particularly adapted for use on float-mounted surface aerators to prevent tipping and even inversion of the aerators due to excessive ice formation, it is to be understood that the invention can also be advantageously utilized on permanently mounted aerators in which the assembly of the throat, diffuser and motor are supported on a platform anchored by posts or the like on the bottom of the pond or reservoir.

The diffuser 12 is supported in spaced relation to the throat as by legs 19 which extend between the diffuser and a mounting ring 21 that is attached as by fasteners 22 to the flange 17a on the throat. The diffuser 12 has its outer periphery 12a spaced above the upper end of the throat 10b to define an annular discharge opening therebetween and, preferably, the diffuser is in the form of an upwardly expanding cone as best shown in FIG. 2 to deflect the stream of water from the throat 10 outwardly in an annular diffuse spray. The diffuser 12 is customarily shaped and arranged with relation to the throat so as to provide maximum aeration and has an outer diameter somewhat larger than the throat and such that the upper projectory of the water spray from the aeration apparatus approaches an optimum angle of about 45°.

The motor 13 has a mounting base 13a which is mounted as on upwardly extending lugs 12b on the upper side of the diffuser 12, inwardly of the periphery 12a of the diffuser, so as to prevent direct impingement of the liquid on the motor. The motor 13 is of the totally enclosed type so as to prevent damage to the motor due to moisture and water which may blow back on the motor and, commonly, the motor is fan cooled and has an internal fan (not shown) which recirculates cooling air through the motor to inhibit overheating. As shown, the motor has air intake and air discharge ports 13b and 13c adjacent opposite ends, with the intake ports 13b preferably located adjacent the upper end of the motor and the discharge ports adjacent its lower end. Power for energizing the motor is supplied through a cable 25 which is connected through a connector box 26 conveniently located on the side of the motor, as shown in FIGS. 1 and 2.

In a surface aeration apparatus, substantial portions of the apparatus are disposed above the surface of the reservoir and difficulties from icing are encountered when the aeration apparatus is operated in subfreezing temperatures. The icing problems are particularly severe when the temperature of the water in the reservoir falls to about freezing temperature and in subzero and high wind conditions. When the water temperature is substantially above freezing, the water flowing through the aeration apparatus will heat the portions of the apparatus contacted by the waer and inhibit ice formation. However, as the water temperature approaches freezing temperature, the heating effect of the water is reduced and the water spray that blows back from the discharge spray can freeze on the diffuser and even on the motor to cause tilting an even inversion of the aerator.

It has been found that excessive ice formation can be effectively prevented, even when the aeration apparatus is operated in sub-zero temperatures and under high wind conditions, by the provision of an annular heating ring on the diffuser so arranged as to prevent formation of ice on the diffuser in the region outwardly of the periphery of the motor. As shown in FIGS. 1 and 2, an annular heating unit 31 is mounted on the diffuser to overlie the upper surface of the diffuser in the region outwardly of the periphery of the motor. The heater unit 31 is preferably formed in two semicircular sections designated 31a and 31 b in FIGS. 3, 5 and 6, to facilitate assembly and removal of the heating unit from the aeration apparatus, and each section of the heating unit includes resistance type heating elements 32 encased in an electrically insulating and water impervious enclosure. For example, the resistance type heating elements can be enclosed in a mat 30 of heat-resistant silicon rubber or in a mat of heat-resistant plastic such as epoxy resins with or without figerglass reinforcement. The heating unit is preferably in the form of a generally flat ring which rests on the upper surface of the diffuser, in heat conducting relation thereto, and is detachably secured to the diffuser as by circumferentially spaced fasteners 35. Plates 36 and fasteners 37 are conveniently utilized to interconnect the semicircular sections 31a and 31b of the heat unit, as best shown in FIG. 3. The heat unit 31 extends at least to the outer periphery 12a of the diffuser and preferably extends radially outwardly of the outer periphery at a level to deflect the liquid discharged from the aeration apparatus and to lower the overall spray pattern. This is advantageous to reduce the spray blowback onto the aeration apparatus and to aid in reducing ice buildup on the exposed portions. The heat unit can of course be removed for operation in the summer, if desired.

Figure 5:
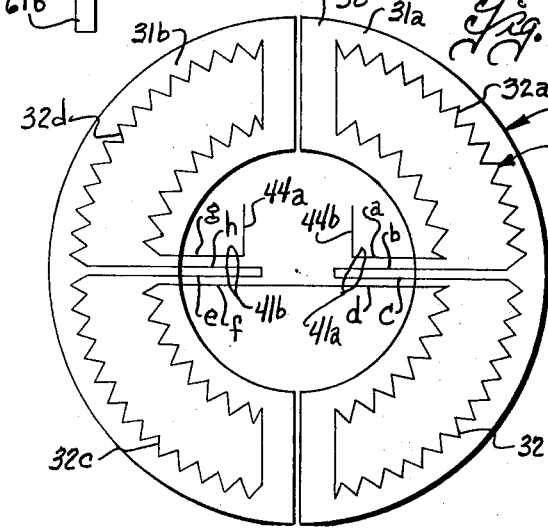
FIG. 5 is a diagrammatic view illustrating one arrangement for connecting the heater unit to a power source.
Figure 6:
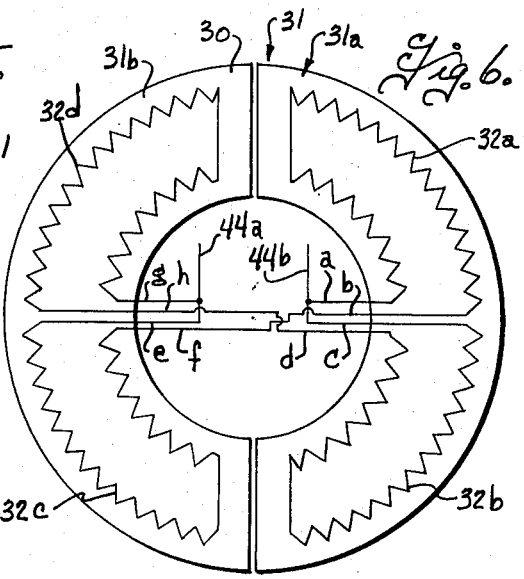
FIG. 6 is a diagrammatic view illustrating a modified arrangement for connecting the heater unit to a power source.

In the embodiment illustrated, power is supplied to the heat unit through cables 41a and 41b which are connected by fittings 42a and 42b to the heater sections 31a and 31b, intermediate their ends. The cable 41a and 41b extend to a junction box 43 conveniently mounted on top of the motor and power is supplied to the heater units through a cable 44. As diagrammatically shown in FIG. 5, the electrical heater elements are arranged in four quadrants including heater elements 32a, 32b in section 31a and heater elements 32c, 32d in section 31b. Cable 41a includes conductors or wires a and b which are connected to the ends of heating elements 32a and wires c and d which are connected to the ends of heating element 32b. Cable 41b includes wires e and f which are connected to the ends of heating element 32c and wires g and h which are connected to the ends of element 32d. In order to prevent nonuniform heating in the event of the burn out of one heating element, provision is made for either electrically connecting all of the heating elements in series as shown in FIG. 5, or for connecting symmetrically opposite ones of the heating elements in series, as shown in FIG. 6. Thus, as shown in FIG. 5, the power supply conductors 44a and 44b in cable 44 are connected to wires a and g, while the wires b and c are interconnected and the wires h and e are similarly interconnected, and the wires f and d are electrically interconnected in the junction box 43 so that all of the four heating elemsnt 32a–32d are electrically connected in series. Alternatively, the power supply conductor 44a in cable 44 can be connected to wires g and e and the power supply conductor 44b in cable 44 connected to wires a and c, with the wire d connected to the wire h and the wire f connected to the wire b so that heating elements 32a and 32c are electrically connected in series with each other and the heating elements 32b and 32d are similarly electrically connected in series with each other, across the power supply conductors 44a and 44b.

Figure 4:
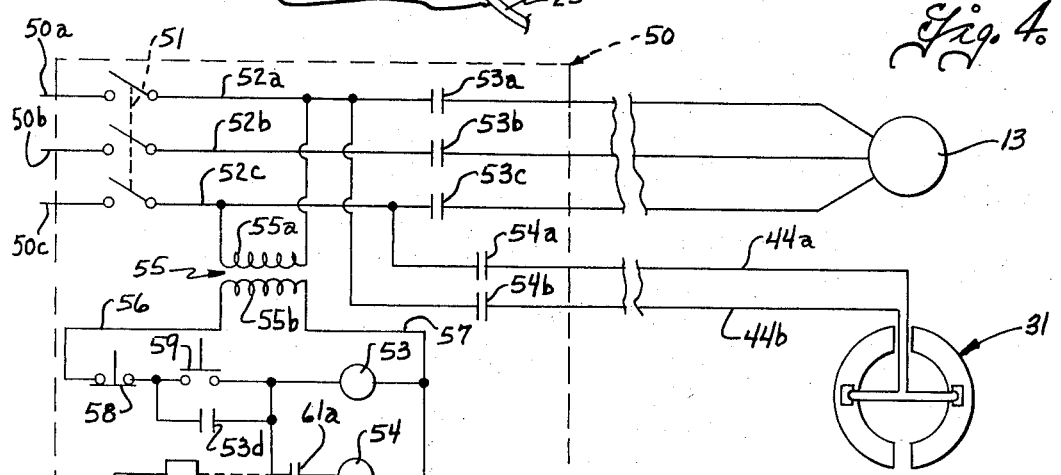
FIG. 4 is a schematic diagram of the electrical control circuit for the aerator.

Reference is now made to the schematic diagram of FIG. 4 which illustrates the electrical control circuit for the aeration unit with the heating apparatus. The controls for the aeration apparatus are conveniently located remote from the aeration apparatus in a control box 50. Power is supplied through main power supply conductors 50a–50c through a main switch 51 to power conductors 52a–52c which are connected through motor relay contacts 53a–53c to the motor 13. The conductors 44a and 44b for the heat unit are connected through relay contacts 54a and 54b to the supply conductors 52a 52c respectively. The control box also includes a step down transformer 55, the primary 55a of which is connected to conductors 52a and 52c, and the secondary 55b of which is connected to a low voltage control circuit including conductors 56 and 57. A motor start relay 53 is connected in series with a normally closed stop switch 58 and a normally open start switch 59 so as to be energized upon closing of the start switch 59 to thereby close the motor start relay contacts 53a–53c. Relay 53 also operates to close normally open relay contacts 53d connected in parallel with the start switch 59 to establish a holding circuit for the motor start relay, to maintain the motor energized until the stop switch 58 is operated to open the circuit to the control relay and thereby stop the motor. The heat unit is energized under the control of a heat unit relay 54 which is connected in series with normally open relay contacts 61a and in parallel with the motor start relay 53 so as to be energized only when the motor start relay is energized and then only under the control of the relay contacts 61a. Relay contacts 61a are in turn controlled by a temperature responsive relay 61 having a temperature sensing element 61b positioned to sense atmospheric temperature and to automatically operate the temperature sensing relay 61 to close relay contact 61a and energize the heater unit, when the atmospheric temperature falls to a preselected minimum.

The heating capacity of the heating unit is selected so as to be operative, when energized, to provide sufficient heat in the heat ring and in the periphery of the diffuser to prevent formation of ice on the diffuser. For example, a heater unit having a capacity of 1,350 watts has been found sufficient for a 20 horsepower size aerator operating in localities having a normal daily minimum temperature of 10° and less. Larger size aeration apparatus, having somewhat larger diffusers and which pump a greater quantity of liquid will require somewhat larger capacity heating units.

From the foregoing it is thought that the construction and operation of the aeration apparatus will be readily understood. The heating unit is detachably mounted on the outer periphery of the diffuser and overlies the upper surface of the diffuser so that, when heated, it effectively prevents formation of ice on the diffuser outwardly of of the motor. The heat losses in the motor will themselves produce some heating of the motor and tend to reduce formation of ice on the motor, particularly if ice buildup is prevented on the diffuser. In addition, the heater ring is advantageously shaped to extend outwardly from the periphery of the diffuser so as to deflect the liquid discharged from the aeration apparatus and lower the overall spray pattern so as to further reduce blowback of spray onto the exposed parts of the aeration apparatus. The temperature sensing apparatus automatically operates the heater to energize the same when the atmospheric temperature falls to a preselected minimum value so as to effect automatic operation of the device.

We claim:

1. In a mechanical surface aeration apparatus including housing means having an upright tubular throat adapted for immersion in a body of liquid at its lower inlet end and a liquid flow diffuser overlying the upper end of the tubular throat with the outer periphery of the diffuser spaced above the upper end of the throat to define an annular outwardly directed liquid discharge opening, means for supporting the housing with the lower inlet end of the thraot immersed in a body of liquid and with the outer periphery of the diffuser above the surface of the body of liquid, a motor mounted on the housing above the diffuser inwardly of the periphery thereof and having a shaft extending downwardly through the diffuser into said throat, and an impeller on the shaft for pumping liquid upwardly through said throat for discharge through said annular discharge opening in an annular spray pattern, the improvement comprising electrical heater means extending around said flow diffuser adjacent the outer periphery thereof and in heat conducting relation thereto for heating the outer periphery of the diffueser to inhibit formation of ice thereon, said heater means extending outwardly from the outer periphery of the diffuser at a level to deflect the liquid passing from the annular discharge opening and lower the spray pattern of the aeration apparatus, and means for energizing said electrical heater means.

2. Amechanical surface aeration apparatus according to claim 1 wherein said means for supporting the housing comprises an annular float disposed outwardly of said throat and below the outer periphery of the diffuser.

3. In a mechanical surface aeration apparatus including housing means having an upright tubular throat adapted for immersion in a body of liquid at its lower inlet end, the housing means having a diffuser overlying the upper end of the throat with the outer peripheral portion of the diffuser spaced above the upper end of the throat to define an annular outwardly directed discharge opening, means for supporting the housing with the lower inlet end of the throat immersed in a body of liquid and with the outer periphery of the diffuser above the surface of the body of liquid, a motor mounted on the housing above the diffuser inwardly of the periphery thereof and having a shaft extending downwardly through the diffuser into said throat, and an impeller on the shaft for pumping liquid up through the throat for discharge through said annular discharge opening in an annular spray pattern, the improvement comprising an annular heater unit having electrical resistance type heating elements therein overlying the upper side of said diffuser outwardly of said motor, said annular heater unit extending outwardly from the outer periphery of the diffuser at a level to deflect the liquid passing from the annular discharge opening and lower the spray pattern of the aeration apparatus, and means for energizing said heater unit to inhibit formation of ice on the upper side of the diffuser.

4. A surface aeration apparatus according to claim 3 wherein said means for supporting said housing includes an annular float disposed outwardly of the throat and below the outer periphery of the diffuser.

5. A surface aeration apparatus according to claim 3 wherein said housing means includes means supporting said motor with its underside spaced above said heater means to substantially avoid heating of the motor by said heater means.

6. A surface aeration apparatus according to claim 3 wherein said annular heater unit includes two semicircular sections each having said electrical resistance elements therein, and means detachably mounting said semicircular sections on the diffuser.

7. A surface aeration apparatus according to claim 6 wherein the electrical resistance elements in one semicircular section are connected electrically in series with electrical resistance elements in the other semicircular section.

8. A surface aeration apparatus according to claim 6 including an electrical junction box mounted on said motor, and conductor means extending from said junction box to said sections of said body.

9. A surface aeration apparatus according to claim 3 wherein said means for energizing said heater means includes means for sensing atmospheric temperature, and means responsive to said temperature sensing means for controlling energization of said electrical heater means.

10. A surface aeration apparatus according to claim 3 wherein said annular heater unit comprises an annular body of heat-resistant plastic having said electical resistance type heating elements embedded therein.

* * * * *